United States Patent
Weissenmayer et al.

(10) Patent No.: US 11,307,066 B2
(45) Date of Patent: Apr. 19, 2022

(54) METHOD AND DEVICE FOR CALIBRATING A SENSOR OF A VEHICLE

(71) Applicant: Robert Bosch GmbH, Stuttgart (DE)

(72) Inventors: Simon Weissenmayer, Flein (DE); Timo Koenig, Unterheinriet (DE); Erik Lesser, Steinheim (DE)

(73) Assignee: Robert Bosch GmbH, Stuttgart (DE)

(*) Notice: Subject to any disclaimer, the term of this patent is extended or adjusted under 35 U.S.C. 154(b) by 431 days.

(21) Appl. No.: 16/292,580

(22) Filed: Mar. 5, 2019

(65) Prior Publication Data
US 2019/0277671 A1    Sep. 12, 2019

(30) Foreign Application Priority Data

Mar. 6, 2018 (DE) .......................... 102018203323.4

(51) Int. Cl.
*G01D 18/00* (2006.01)
(52) U.S. Cl.
CPC .................................. *G01D 18/002* (2013.01)
(58) Field of Classification Search
CPC .................................................... G01D 18/002
See application file for complete search history.

(56) References Cited

U.S. PATENT DOCUMENTS

2015/0066412 A1* 3/2015 Nordbruch ........... G01D 18/002
                                                                 702/104

FOREIGN PATENT DOCUMENTS

WO    WO-2017189361 A1 * 11/2017 .......... B60W 50/029

OTHER PUBLICATIONS

Miluzzo et al., "CaliBree: A Self-calibration System for Mobile Sensor Networks", S. Nikoletseas et al. (Eds.): DCOSS 2008, LNCS 5067, pp. 314-331, 2008. Springer-Verlag Berlin Heidelberg 2008 (Year: 2008).*

* cited by examiner

*Primary Examiner* — Regis J Betsch
(74) *Attorney, Agent, or Firm* — Norton Rose Fulbright US LLP; Gerard Messina

(57) ABSTRACT

A method for calibrating a sensor of a vehicle is provided. In this method, a sensor measured value that includes a measuring position and a measurement time is received by a data processing unit. Based on the measuring position and the measurement time, the sensor measured value is assigned to at least one reference measured value, which has been ascertained with a reference sensor of a reference vehicle at a reference position and at a reference measurement time, if the measurement time of the sensor measured value and the reference measurement time deviate from one another by a maximum of 30 minutes. In addition, at least one reference calibration value of the reference sensor is communicated to the vehicle and/or provided to the vehicle, so that an instantaneous calibration value of the sensor may be adapted based on the reference calibration value.

12 Claims, 2 Drawing Sheets

METHOD AND DEVICE FOR CALIBRATING A SENSOR OF A VEHICLE

CROSS REFERENCE

The present application claims the benefit under 35 U.S.C. § 119 of German Patent Application No. DE 102018203323.4 filed on Mar. 6, 2018, which is expressly incorporated herein by reference in its entirety.

FIELD

The present invention relates to a method for calibrating a sensor of a vehicle. The present invention further relates to a data processing unit for calibrating a sensor of a vehicle.

BACKGROUND INFORMATION

Modern vehicles are equipped with a multitude of sensors, which may be used, in particular, for detecting surroundings of the vehicles. In vehicles of one vehicle type such as, for example, vehicles of a vehicle series and/or in vehicles of a different vehicle type, identical sensors may sometimes provide different sensor measured values and/or measured values. This may be due to the fact that sensor-inherent parameters such as, for example, installation position and/or orientation of the respective sensors differ from one another. Vehicle-specific parameters may also influence the sensor measured values detected with the respective sensors. Examples of such vehicle-specific parameters are, for example, a trailer load, a trailer operation, a wheel size and/or a transport load. Attachments to the individual vehicles such as, for example, a rear spoiler, a bicycle rack, a roof rack and/or a luggage rack may also influence the sensor measured values detected by the respective sensors. Such influences on the sensor measured values may be compensated for with suitable calibration values.

A vehicle-specific and/or vehicle-individual calibration of the sensors and/or an application of sensors in individual vehicles may sometimes be complex, however, and result in an increased development effort.

SUMMARY

An improved method for calibrating a sensor of a vehicle may be advantageously provided by specific embodiments of the present invention.

One aspect of the present invention relates to a method for calibrating a sensor of a vehicle. The example method includes a step of receiving, with a data processing unit, at least one sensor measured value ascertained with the sensor, a measuring position on a roadway on which the sensor measured value has been ascertained, and a measurement time at which the sensor measured value has been ascertained. The measurement time in this case may be a point in time and/or a period of time. The method is distinguished, in particular, by the following steps:

based on the measuring position and the measurement time, assigning the sensor measured value to at least one reference measured value, which has been ascertained using a reference sensor of a reference vehicle at a reference position of the roadway and at a reference measurement time, the sensor measured value being assigned to the reference measured value if the measurement time of the sensor measured value and the reference measurement time deviate from one another by a maximum of 30 minutes; and providing and/or communicating, to the vehicle, at least one reference calibration value of the reference sensor for adapting and/or while adapting an instantaneous calibration value of the sensor based on the reference calibration value.

The sensor measured value ascertained with the sensor may, in general, be a raw sensor value and/or a measured value based on at least one instantaneous calibration value of the sensor. The sensor may be designed and/or configured, in particular, for detecting surroundings of the vehicle. The sensor measured value ascertained with the sensor may be provided to the data processing unit, together with the measuring position and the measurement time, for example, based on a communication and/or a transmission from the vehicle to the data processing unit. Such a communication and/or transmission may take place, in particular, wirelessly, for example, via an Internet connection, a Bluetooth connection and/or a telephone network. It may also be provided to provide the data processing unit with the instantaneous calibration value of the sensor and/or to communicate the instantaneous calibration value of the sensor to the data processing unit. The data processing unit in this case may be situated at least partially in the vehicle. Alternatively or in addition, the data processing unit may be an off-board data processing unit. The data processing unit may, for example, include at least one server and/or one cloud server. The data processing unit may also include multiple data processing elements, so that the method according to the present invention may be carried out in part in an on-board data processing element and in part in an off-board data processing element. A sensor type of the sensor may also be communicated and/or provided to the data processing unit. Furthermore, the measuring position may include geographic coordinates, which have been ascertained, for example, with a position finding device (for example, GPS) of the vehicle.

The reference vehicle may refer, in general, to an arbitrary other vehicle. In contrast to the sensor of the vehicle, however, the reference sensor of the reference vehicle may be correctly calibrated based on the reference calibration value. One or multiple reference measured values of the reference sensor, together with the associated reference measuring position and the reference measurement time, may be stored in the data processing unit and/or in a data memory of the data processing unit. One or multiple reference calibration values may also be stored in the data processing unit. Furthermore, a type and/or a type designation for each reference sensor may be stored in the data processing unit. A vehicle type of the reference vehicle may also be stored in the data memory.

According to the present invention, it is provided to provide to the data processing unit the sensor measured value with measuring position and measurement time, in particular, during the operation of the vehicle. Based on the measuring position, the data processing unit is able to ascertain at least one reference measured value, which has been ascertained at a position on the roadway similar and/or identical to the measuring position. Based on the measurement time, the data processing unit is furthermore able to ascertain at least one reference measured value, the reference measurement time of which deviates by not more than 30 minutes from the measurement time. In this way, the sensor measured element may be assigned one or multiple reference measured values.

The data processing unit and/or a data processing element of the data processing unit may optionally then ascertain a deviation between the values based on a comparison of the reference measured value (or of multiple reference measured values) and of the sensor measured value. In this case, the data processing unit and/or the associated data processing element may be situated in the vehicle or outside the vehicle. If the ascertained deviation reaches or exceeds a threshold value, which may be stored in a data memory of the vehicle and/or of the data processing unit, for example, then the data processing unit may provide the vehicle with the reference calibration value. The reference calibration value in this case may be communicated to and/or provided to the vehicle by the data processing unit.

The instantaneous calibration value of the vehicle may be adapted and/or changed based on the reference calibration value. The reference calibration value in this case may refer to a correction value for the instantaneous calibration value, on the basis of which the instantaneous calibration value may be adapted. Alternatively or in addition, the reference calibration value may refer to a parameterization value for the sensor, on the basis of which the sensor may be parameterized. The reference calibration value may therefore overwrite the instantaneous calibration value, for example.

The present invention may be considered, in particular, to be based on the findings described below. Ambient conditions of the vehicle, a roadway condition and/or a roadway parameter may sometimes change in relatively short periods of time. For example, a friction coefficient between vehicle and roadway, a light exposure, a snow cover and/or a water level on the roadway at a particular position on the roadway may change relatively quickly, the water level on a roadway also including the degree of moisture of a roadway. A comparison of a reference measured value, which has been ascertained at the same roadway position as the sensor measured value, but at a reference measurement time long before or long after the measurement time of the sensor measured value, may therefore result in a significant deviation of the reference measured value from the sensor measured value. However, such a deviation cannot be caused by an erroneous calibration value of the sensor, but essentially by the deviation of the reference measurement time from the measurement time of the sensor measured value and resultant changes of the associated measured variable.

According to the present invention, it is therefore provided to assign the sensor measured value to a reference measured value only if the reference measurement time deviates from the measurement time of the sensor measured value by a maximum of 30 minutes. In this way, it may be ensured that the reference measured value and the sensor measured value have been ascertained under similar, identical and/or essentially equal conditions. In this way, errors in the ascertainment of the reference calibration value as a whole may be avoided. In other words, it may be ensured in this way that the vehicle is consistently provided with a correct reference calibration value. Thus, an improved and more robust method for calibrating the sensor of the vehicle as a whole may be provided.

According to one specific embodiment of the present invention, the sensor measured value is assigned to the reference measured value if the measurement time of the sensor measured value and the reference measurement time deviate from one another by a maximum of ten minutes, in particular, by a maximum of five minutes. In other words, it may be provided that the sensor measured value is assigned to the reference measured value only if the measurement time and the reference measurement time deviate from one another only in a range of less than ten minutes. In this way, it may be ensured that conditions under which the reference measured value has been ascertained and conditions under which the sensor measured value has been ascertained are essentially identical, similar and/or unchanged, so that the vehicle may be provided with the correct reference calibration value based on the assigned reference measured value.

According to one specific embodiment of the present invention, the method further includes the step of ascertaining a deviation between the reference measured value and the sensor measured value and the step of comparing the ascertained deviation with a threshold value, the at least one reference calibration value of the reference sensor being communicated to the vehicle if the ascertained deviation exceeds the threshold value.

According to one specific embodiment of the present invention, the method further includes a step of ascertaining a traffic lane, in which the vehicle was situated during the ascertainment of the sensor measured value. The traffic lane in this case may be ascertained by the vehicle and be communicated to the data processing unit. The data processing unit may also ascertain the traffic lane, based for example on the measuring position. Alternatively or in addition, the method includes the step of providing, transmitting to the data processing unit and/or receiving, a variable correlating with the traffic lane, the sensor measured value being assigned to the reference measured value if the reference measured value has been ascertained by the reference vehicle in the same traffic lane. For example, a water level in different traffic lanes may differ significantly at a particular measuring position. By assigning the reference measured value to the sensor value if both values have been ascertained in the same traffic lane, it may be ensured that the reference measured value and the sensor measured value have been ascertained under essentially identical and/or similar conditions. In this way, the method for calibrating the sensor may be further improved and be designed to be more robust and less susceptible to errors.

According to one specific embodiment of the present invention, the method further includes the step of ascertaining a driving direction, in which the vehicle was situated during the ascertainment of the sensor measured value. The driving direction in this case may be ascertained from the vehicle and/or from the data processing unit, based, for example, on two measuring positions of two consecutive sensor measured values. Alternatively or in addition, the method includes a step of providing, communicating and/or transmitting a variable correlating with the driving direction to the data processing unit, the sensor measured value being assigned to the reference measured value if the reference measured value has been ascertained by the reference vehicle in the same driving direction. Similar to the assignment based on the traffic lane, the method for calibrating the sensor in this way may be further improved and designed to be more robust and less susceptible to errors.

A sensor type of the sensor may also be ascertained, provided and/or transmitted to the data processing unit. For example, the data processing unit may assign the sensor measured value to a reference measured value of a reference sensor of the same sensor type.

According to one specific embodiment of the present invention, the sensor measured value is assigned to the reference measured value if during the ascertainment of the reference measured value, the reference vehicle was situated in the same traffic lane and in the same driving direction as the vehicle. In other words, the reference measured value may be assigned to the sensor measured value if the vehicle and the reference vehicle drove in the same traffic lane in the same driving direction in succession in a time span of a maximum of 30 minutes. This, too, may increase the robustness of the method for calibrating the sensor and may reduce the susceptibility to errors.

According to one specific embodiment of the present invention, the data processing unit is an off-board data processing unit. Alternatively or in addition, the data processing unit includes at least one cloud server and/or is designed as a cloud server. The data processing unit may, for example, include a data memory, in which a multitude of reference measured values and/or reference calibration values of a multitude of reference vehicles is stored. Thus, a comprehensive database may be provided for calibrating many sensors.

According to one specific embodiment of the present invention, the at least one sensor is configured to ascertain at least one parameter selected from the group made up of a water level on the roadway, of a brightness, of a friction coefficient, of a precipitation amount, of a snow cover, of a roadway icing, of a road surface irregularity, of a wind velocity, of an ambient temperature, of an air pressure and of an atmospheric humidity. The sensor may, for example, be a sensor for detecting a roadway status, a roadway condition, the environment and/or surroundings of the vehicle. Such measured variables may change in relatively short time spans, for example, as compared to an object in a roadway, which may be recognized with the aid of a camera in conjunction with an object recognition, so that the method according to the present invention may be particularly advantageously used for such sensors. It is emphasized, however, that the present invention is not limited to the aforementioned sensors, but may, in principle, be used for calibrating arbitrary sensors.

According to one specific embodiment of the present invention, the method further includes a step of ascertaining a vehicle type of the vehicle. Alternatively or in addition, the method includes a step of providing, transmitting and/or communicating the instantaneous calibration value and a variable correlating with the vehicle type.

According to one specific embodiment of the present invention, the method further includes a step of ascertaining, with the data processing unit, a mean value and/or a standard deviation of a plurality of instantaneous calibration values of a plurality of vehicles of the same vehicle type. Alternatively or in addition, the method includes a step of providing, communicating and/or transmitting the mean value as a mean calibration value and/or the standard deviation to at least one additional vehicle of the same vehicle type for calibrating an additional sensor of the at least one additional vehicle. In this way, it is possible, for example, to calibrate the sensors of vehicles of one vehicle type and/or of a vehicle series with the mean calibration value. Thus, a pre-calibration at the vehicle manufacturer may be omitted. In addition, the plurality of instantaneous calibration values may have been previously adapted by one or multiple reference calibration values from one or multiple reference vehicles. Thus, by using instantaneous calibration values adapted in such a way for calibrating the additional sensor, a correctness of the calibration value of the additional vehicle adapted thereby may be ensured. Furthermore, a precision and/or accuracy of the mean calibration value may be increased by the formation of the mean value. In addition, the standard deviation may be used to estimate an inaccuracy of the mean value and/or of the mean calibration value.

According to one specific embodiment of the present invention, the method further includes a step of ascertaining an upper limit and a lower limit for the mean calibration value based on the ascertained mean value and on the ascertained standard deviation. The method further includes the step of providing, communicating and/or transmitting the upper limit and the lower limit to the at least one additional vehicle of the same vehicle type for calibrating the additional sensor of the at least one additional vehicle. The upper limit and the lower limit may be used as a measure for an uncertainty and/or accuracy of the mean calibration value. This uncertainty may, for example, be taken into account in conjunction with a processing and/or evaluation of the sensor measured values of the sensor by a control unit of the vehicle.

According to one specific embodiment of the present invention, the method further includes a step of ascertaining, with the data processing unit, a median of a plurality of reference calibration values of a plurality of reference vehicles, as well as a step of transmitting the median to the vehicle as a reference calibration value. In this way, the method may be designed more robustly with respect to an outlier of the reference calibration values and the calibration as a whole may be further improved. Such an outlier may appear, for example, if a reference sensor is defective and/or if attachments, such as a roof rack or the like are situated on the associated reference vehicle.

Another aspect of the present invention relates to a data processing unit for calibrating a sensor of a vehicle, the data processing unit being configured to carry out the method as described above and in the following. The data processing unit may include a data memory and a processor. A program element and/or software instruction may be stored in the data memory, which, when executed in the processor, instructs the data processing unit to carry out the method as described above and in the following. One or multiple reference measured values, including the associated reference measuring positions and reference measurement times, may also be stored in the data memory. One or multiple reference calibration values may also be stored in the data memory. One or multiple sensor measured values, including associated measuring position, measurement time and/or instantaneous calibration values, may also be stored in the data memory. The data memory unit may include, in particular, one or multiple cloud server(s).

Features, elements and/or steps of the method, as described above and below may be features and/or elements of the data processing unit, and vice versa.

BRIEF DESCRIPTION OF THE DRAWINGS

Exemplary embodiments of the present invention are described in detail below with reference to the figures.

The figures are merely schematic and not true to scale. Identical, identically operating or similar elements in the figures are provided with the same reference numerals.

DETAILED DESCRIPTION OF EXAMPLE EMBODIMENTS

Figure 1:
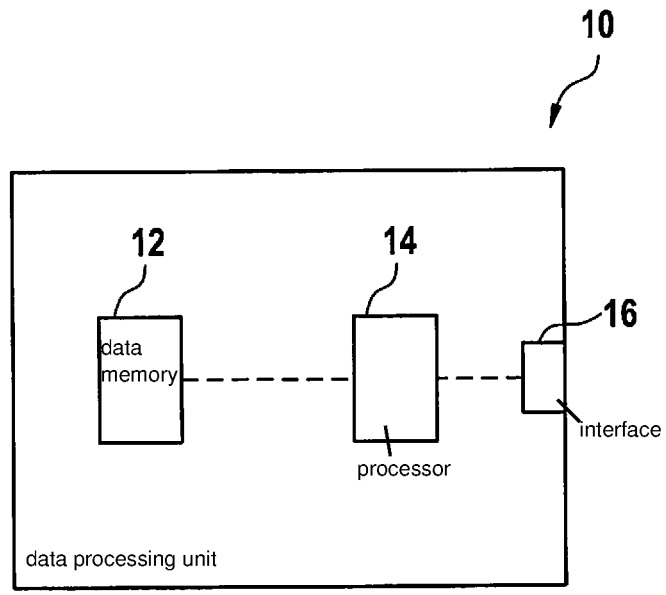
FIG. 1 shows a data processing unit according to one exemplary embodiment of the present invention.

FIG. 1 shows a data processing unit 10 according to one exemplary embodiment of the present invention.

Data processing unit 10 includes a data memory 12 and a processor 14.

One or multiple reference measured value(s), including the associated reference measuring positions and reference measurement times, may be stored in data memory 12. One or multiple reference calibration value(s) may also be stored in data memory 12. In addition, one or multiple sensor measured value(s) from one or multiple sensor(s) 20 (see FIG. 2) of one or multiple vehicle(s) 18, including associated measuring position, measurement time and/or instantaneous calibration values of the respective sensors may also be stored in data memory 12.

Data processing unit 10 may include, in particular, one or multiple cloud server(s) and/or may be designed in the form of one or multiple cloud server(s).

Figure 2:
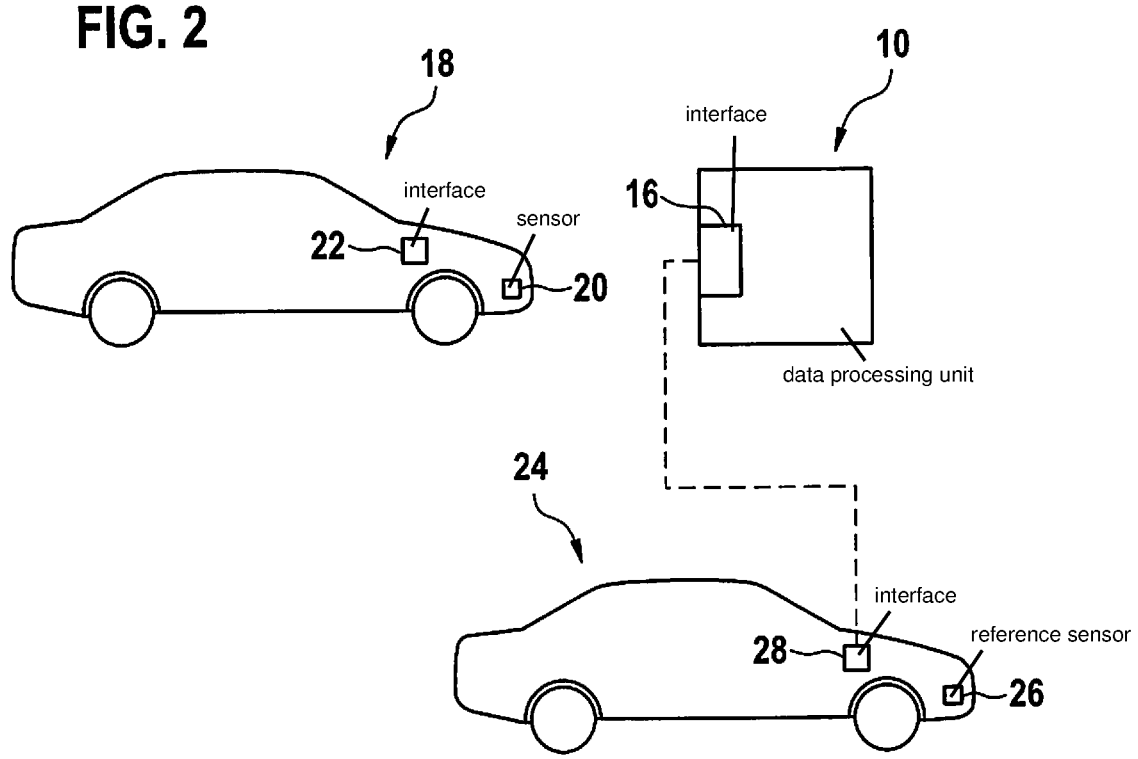
FIG. 2 shows a data processing unit and a vehicle according to one exemplary embodiment of the present invention.

Data processing unit 10 further includes an interface 16 for communication, in particular, for bi-directional communication and/or wireless communication, with vehicles 18 (see FIG. 2). Based on the interface, it is possible, for example, to establish an Internet connection, a telephone network connection, a data network connection, a Bluetooth connection and/or an arbitrary other wireless connection to one or to multiple vehicle(s) 18.

FIG. 2 shows a data processing unit 10 and a vehicle 18 according to one exemplary embodiment of the present invention. Unless described otherwise, data processing unit 10 of FIG. 2 includes the same elements and features as data processing unit 10 of FIG. 1.

Vehicle 18 includes a sensor 20. Sensor 20 may be configured to ascertain a water level on the roadway, a brightness, a friction coefficient, a precipitation amount, a snow cover, a roadway icing, a road surface irregularity, a wind velocity, an ambient temperature, an air pressure and an atmospheric humidity. The vehicle may also include multiple of such sensors 20.

Vehicle 18 further includes an interface 22 for communicating with data processing unit 10. Interface 22 of vehicle 18 in this case may be designed to correspond to interface 16 of data processing unit 10.

Via the interface, vehicle 18 may communicate to data processing unit 10 a sensor measured value of sensor 20, a measuring position, a measurement time, a sensor type of sensor 20, a roadway on which vehicle 18 is situated, a driving direction, in which vehicle 18 moves, a driving speed, a vehicle type of vehicle 18 and/or additional parameters or variables.

A reference vehicle 24 is also shown in FIG. 2, which may communicate one or multiple reference value(s) of one or multiple reference sensor(s) 26 of reference vehicle 24 to data processing unit 10. The associated reference measuring positions, reference measurement times may also be communicated. For this purpose, reference vehicle 24 includes an interface 28 for communicating with data processing unit 10. In addition, at least one reference calibration value may be communicated via interface 28 to data processing unit 10. A sensor type of reference sensor 26, a vehicle type of reference vehicle 24, a roadway, a driving direction, a driving speed of reference vehicle 24 and/or additional variables may also be communicated to data processing unit 10.

Figure 3:
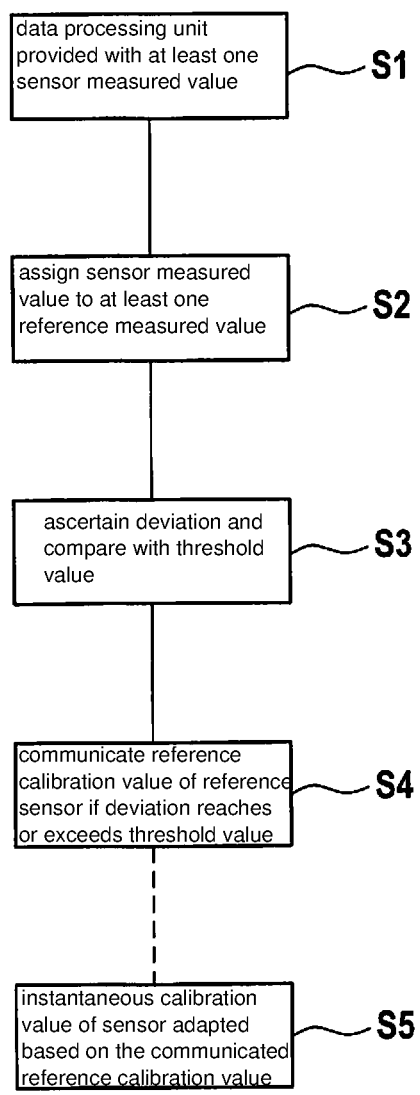
FIG. 3 shows a flow chart for illustrating steps of the method for calibrating a sensor according to one exemplary embodiment of the present invention.

FIG. 3 shows a flow chart for illustrating steps of the method for calibrating a sensor 20 of a vehicle 18 according to one exemplary embodiment.

In step S1, data processing unit 10 is provided with at least one sensor measured value ascertained with sensor 20, a measuring position on a roadway at which the sensor measured value has been ascertained, and a measurement time, at which the sensor measured value has been ascertained. The sensor measured value, the measuring position and the measurement time may, for example, be communicated via interfaces 22 and 16 to data processing unit 10.

Optionally, a sensor type of sensor 20, a traffic lane in which vehicle 18 moves, a driving direction in which vehicle 18 moves, a driving speed of vehicle 18, a vehicle type of vehicle 18 and/or additional variables may be ascertained and/or provided to data processing unit 10 in step S1.

In another step S2, the sensor measured value is assigned to at least one reference measured value, the reference measured value having been ascertained with a reference sensor 26 of a reference vehicle 24 at a reference position of the roadway and at a reference measurement time. The sensor measured value is assigned to the reference measured value if the measurement time of the sensor measured value and the reference measurement time deviate from one another by a maximum of 30 minutes, for example, by a maximum of 10 minutes, in particular, by a maximum of 5 minutes.

The sensor measured value may optionally be assigned to the reference measured value in step S2 only if reference vehicle 24 and vehicle 18 have been moved in the same traffic lane and/or in the same driving direction. A vehicle velocity and/or a vehicle type of reference vehicle 24 and of vehicle 18 may also be taken into account when assigning a sensor type of sensor 20 and of reference sensor 26.

A deviation between the reference measured value and the sensor measured value is ascertained in a further step S3, and the ascertained deviation is compared with a threshold value. This step may take place in vehicle 18 and/or in data processing unit 10.

In a further step S4, at least one reference calibration value of reference sensor 26 is communicated by data processing unit 10 to vehicle 18 if the deviation ascertained in step S3 reaches and/or exceeds the threshold value.

A median of a plurality of reference calibration values of a plurality of reference vehicles 24 may optionally be ascertained in step S4. The ascertained median may then be communicated as a reference calibration value to vehicle 18.

In an optional step S5, an instantaneous calibration value of sensor 20 of vehicle 18 may be adapted based on the communicated reference calibration value. For example, the instantaneous calibration value may be changed, corrected and/or overwritten based on the reference calibration value.

Additional optional steps of the method are described below, which may be carried out alternatively or in addition to one or to multiple of the preceding steps. For example, a mean value and/or a standard deviation of a plurality of instantaneous calibration values of a plurality of vehicles 18 of the same vehicle type may be ascertained with data processing unit 10. The standard deviation and/or the mean value may be communicated as a mean calibration value to at least one additional vehicle of the same vehicle type for calibrating an additional sensor of the at least one additional vehicle. An upper limit and a lower limit for the mean calibration value may also be ascertained based on the ascertained mean value and/or on the standard deviation. The upper limit and the lower limit may also be communicated to the at least one additional vehicle for calibrating the additional sensor of the at least one additional vehicle.

Aspects, features and/or steps of the present invention are summarized below. When a vehicle 18 that has a sensor 20 to be calibrated and a reference vehicle 24 drive one after the other, sensor 20 to be calibrated may according to the present invention then be matched to the reference measured value of reference sensor 26 of reference vehicle 24.

Reference vehicles 24, that include calibrated reference sensors 26, and vehicles 18 to be calibrated may regularly transmit their position and/or driving direction to data processing unit 10. When a reference vehicle 24 and a vehicle 18 to be calibrated drive one after the other, then data processing unit 10 may prompt both vehicles 18, 24, to transmit, for example, their sensor raw values and the measured values calculated therefrom, i.e., the reference measured value and the sensor measured value, together with reference measuring position and reference measurement time or with measuring position and measurement time, to data processing unit 10. The respective traffic lane, the driving direction and additional parameters such as, for example, driving speed, may also be transmitted. Since many ambient conditions for both vehicles 18, 24 at the same location at closely spaced points in time do not differ significantly, long-term systematic deviations in the sensor measured value from the reference measured value of sensors 20, 26 deviating from one another, their installation position and/or influences of deviating vehicle characteristics may be attributed to the sensor system.

If a sensor 20, for example, a water level sensor 20 of vehicle 18 to be calibrated, measures a higher water level on the road over a longer period of time than a reference sensor 26 of reference vehicle 24, then the instantaneous calibration value of vehicle 18 (or a corresponding correction value) may be adapted in such a way that vehicle 18 to be calibrated, using the adapted calibration value, supplies the same measured values or sensor measured values under the same ambient conditions as reference vehicle 24. The same applies to arbitrary other sensors.

Learned correction values and/or updated or adapted calibration values may be exchanged between identically designed vehicles 18 via data processing unit 10. Thus, it is possible to merge the adapted calibration values of multiple vehicles 18 and to transmit them to vehicles 18, which themselves have not been calibrated with the aid of reference vehicles 24 using the above described method.

In order to avoid errors during calibration, minimum and maximum limits for the calibration values of multiple vehicles 18 may initially be set in the factory. These limits may be restricted once again and/or adapted by data processing unit 10. The restricted limits may be ascertained by data processing unit 10 from the mean value and from the standard deviation of the calibration values and/or from corresponding correction values across multiple identically designed vehicles 18 and, together with the mean value, be transmitted to all other identically designed vehicles 18, for example, of the same series. The vehicles may use the mean value as a substitute value for the calibration value until they have had the opportunity to calibrate their sensors with the aid of reference vehicles 24. Since the substitute values may be inaccurate, it may be advantageous to replace these values as soon as possible by reference calibration values of reference vehicles 24. If there are no reference vehicles 24 close by that enable learning, then it may still be advantageous to adopt the substitute values of vehicles 18, which themselves have been calibrated by reference vehicles 24. However, once vehicles 18 have the opportunity to adopt a reference calibration value directly from reference vehicles 24, the instantaneous calibration value and/or the substitute value may then be overwritten.

Vehicles 18 may attempt to calibrate the sensor measured values based on preferably many different reference vehicles 24. Thus, it is possible that one reference calibration value each is ascertained (and/or a correction value is calculated) with the aid of multiple reference vehicles 24 at the same measuring position, and data processing unit 10 ascertains the median or median value from these reference calibration values (and/or correction values), and communicates the median value as the reference calibration value to additional vehicles 18. Since reference vehicles may, in principle, also be modified (wide tires, lowering, roof luggage racks, trailers, . . . ), data processing unit 10 may check whether reference vehicles 24 furnish coinciding reference measured values, for example, if the reference vehicles travel the same distance within a short period of time. The better the reference measured values coincide with other values of other reference vehicles 24, the stronger the corresponding reference measured value may be considered in the calibration of other vehicles 18.

A development effort for vehicles 18 as a whole may be advantageously reduced by the present invention, since new vehicle models are able to automatically calibrate their sensor system to a certain extent during the first operating hours. In this way, new sensors may also be more rapidly integrated into vehicle models. In addition, the present invention allows for a more robust ascertainment of correct calibration values for vehicles 18, for example, since changes to vehicles 18 that influence the sensor system, for example, due to contamination, or due to the connection of a trailer, due to the calibration with reference vehicles 24 may be automatically taken into account.

The present invention may be advantageously used in all networked vehicles 18, 24. The method may be advantageous, in particular, or use in a "hydroplaning alert system," for example, to keep application costs across vehicle variants to a minimum and to be able to bring the feature preferably rapidly into serial production.

It should also be noted that "including" does not exclude any other elements and "one" does not exclude any plurality. It is further noted that features that have been described with reference to one of the above exemplary embodiments may also be used in combination with other features of other exemplary embodiments described above. Reference numerals in the claims are not to be considered as limiting.

What is claimed is:

1. A method for improving a calibration of a first sensor of a first vehicle, the method comprising:

receiving, with a data processing unit, at least one sensor measured value ascertained with the first sensor, a measuring position on a roadway, on which the sensor measured value has been ascertained, a measurement time at which the sensor measured value has been ascertained, and a sensor type of the first sensor, wherein the data processing unit is external to the first vehicle;

assigning, based on the measuring position, the measurement time, and the sensor type of the first sensor, the sensor measured value to at least one reference measured value and its associated information, the reference measured value having been ascertained with a reference sensor, of a reference vehicle, of the same sensor type as the first sensor, at a reference position of the roadway and at a reference measurement time, the sensor measured value being assigned to the reference measured value when the measurement time of the sensor measured value and the reference measurement time deviate from one another by a maximum of 30 minutes;

wirelessly providing and/or wirelessly communicating to the first vehicle, at least one reference calibration value of the reference sensor for adapting an instantaneous calibration value of the first sensor based on the reference calibration value;

adapting, by the first vehicle, the instantaneous calibration value of the first sensor based on the reference calibration value;
ascertaining, with the data processing unit, a median of a plurality of reference calibration values of a plurality of reference vehicles; and
transmitting the median as the reference calibration value to the first vehicle.

2. The method as recited in claim 1, wherein the sensor measured value is assigned to the reference measured value when the measurement time of the sensor measured value and the reference measurement time deviate from one another by a maximum of ten minutes.

3. The method as recited in claim 1, wherein the sensor measured value is assigned to the reference measured value when the measurement time of the sensor measured value and the reference measurement time deviate from one another by a maximum of five minutes.

4. The method as recited in claim 1, further comprising:
ascertaining a deviation between the reference measured value and the sensor measured value and comparing the ascertained deviation with a threshold value, the at least one reference calibration value being communicated to the first vehicle and/or provided to the first vehicle when the ascertained deviation exceeds the threshold value.

5. The method as recited in claim 1, further comprising:
at least one of: (i) ascertaining a traffic lane, in which the first vehicle is situated during the ascertainment of the sensor measured value; and/or (ii) providing a variable correlating with the traffic lane;
wherein the sensor measured value is assigned to the reference measured value when the reference measured value has been ascertained by the reference vehicle in the same traffic lane.

6. The method as recited in claim 1, further comprising:
at least one of: (i) ascertaining a driving direction, in which the first vehicle was situated during the ascertainment of the sensor measured value; and/or (ii) providing a variable correlating with the driving direction;
wherein the sensor measured value is assigned to the reference measured value when the reference measured value has been ascertained by the reference vehicle in a same driving direction.

7. The method as recited in claim 1, wherein the data processing unit is an off-board data processing unit, and/or the data processing unit includes at least one cloud server.

8. The method as recited in claim 1, wherein the first sensor is configured to ascertain at least one parameter selected from the group made up of: (i) a water level on the roadway, (ii) a brightness, (iii) a friction coefficient, (iv) a precipitation amount, (v) a snow cover, (vi) a roadway icing, (vii) a road surface irregularity, (viii) a wind velocity, (ix) an ambient temperature, (x) an air pressure, and (x) an atmospheric humidity.

9. The method as recited in claim 1, further comprising:
at least one of: (i) ascertaining a vehicle type of the first vehicle, and/or (ii) providing the instantaneous calibration value and a variable correlating with the vehicle type.

10. The method as recited in claim 9, further comprising:
ascertaining, with the data processing unit, a mean value and/or a standard deviation of a plurality of instantaneous calibration values of a plurality of vehicles of the same vehicle type; and providing the standard deviation and/or the mean value as a mean calibration value to at least one additional vehicle of the same vehicle type for calibrating an additional sensor of the at least one additional vehicle.

11. A method for improving a calibration of a first sensor of a first vehicle, the method comprising:
receiving, with a data processing unit, at least one sensor measured value ascertained with the first sensor, a measuring position on a roadway, on which the sensor measured value has been ascertained, a measurement time at which the sensor measured value has been ascertained, and a sensor type of the first sensor, wherein the data processing unit is external to the first vehicle;
assigning, based on the measuring position, the measurement time, and the sensor type of the first sensor, the sensor measured value to at least one reference measured value and its associated information, the reference measured value having been ascertained with a reference sensor, of a reference vehicle, of the same sensor type as the first sensor, at a reference position of the roadway and at a reference measurement time, the sensor measured value being assigned to the reference measured value when the measurement time of the sensor measured value and the reference measurement time deviate from one another by a maximum of 30 minutes;
wirelessly providing and/or wirelessly communicating to the first vehicle, at least one reference calibration value of the reference sensor for adapting an instantaneous calibration value of the first sensor based on the reference calibration value;
adapting, by the first vehicle, the instantaneous calibration value of the first sensor based on the reference calibration value;
ascertaining, with the data processing unit, a mean value and/or a standard deviation of a plurality of instantaneous calibration values of a plurality of vehicles of the same vehicle type;
providing the standard deviation and/or the mean value as a mean calibration value to at least one additional vehicle of the same vehicle type for calibrating an additional sensor of the at least one additional vehicle;
ascertaining an upper limit and a lower limit for the mean calibration value based on the ascertained mean value and on the ascertained standard deviation; and
providing the upper limit and the lower limit to the at least one additional vehicle of the same vehicle type for calibrating the additional sensor of the at least one additional vehicle.

12. A data processing unit for improving calibration of a first sensor of a first vehicle, the data processing unit being configured to:
receive, with a data processing unit, at least one sensor measured value ascertained with the first sensor, a measuring position on a roadway, on which the sensor measured value has been ascertained, a measurement time at which the sensor measured value has been ascertained, and a sensor type of the first sensor, wherein the data processing unit is external to the first vehicle;
assign, based on the measuring position, the measurement time, and the sensor type, the sensor measured value to at least one reference measured value and its associated information, the reference measured value having been ascertained with a reference sensor, of a reference vehicle, of the same sensor type as the first sensor, at a reference position of the roadway and at a reference measurement time, the sensor measured value being assigned to the reference measured value when the measurement time of the sensor measured value and the reference measurement time deviate from one another by a maximum of 30 minutes;

wirelessly provide and/or wirelessly communicate to the first vehicle, at least one reference calibration value of the reference sensor for adapting an instantaneous calibration value of the first sensor based on the reference calibration value;

wherein the first vehicle adapts the instantaneous calibration value of the first sensor based on the reference calibration value;

and wherein the data processing unit is further configured to:
- ascertain a median of a plurality of reference calibration values of a plurality of reference vehicles; and
- transmit the median as the reference calibration value to the first vehicle.

\* \* \* \* \*